March 18, 1952     R. C. LAWRENCE     2,589,713
APPARATUS FOR CONTINUOUSLY MAKING VULCANIZED ARTICLES
Filed May 22, 1947
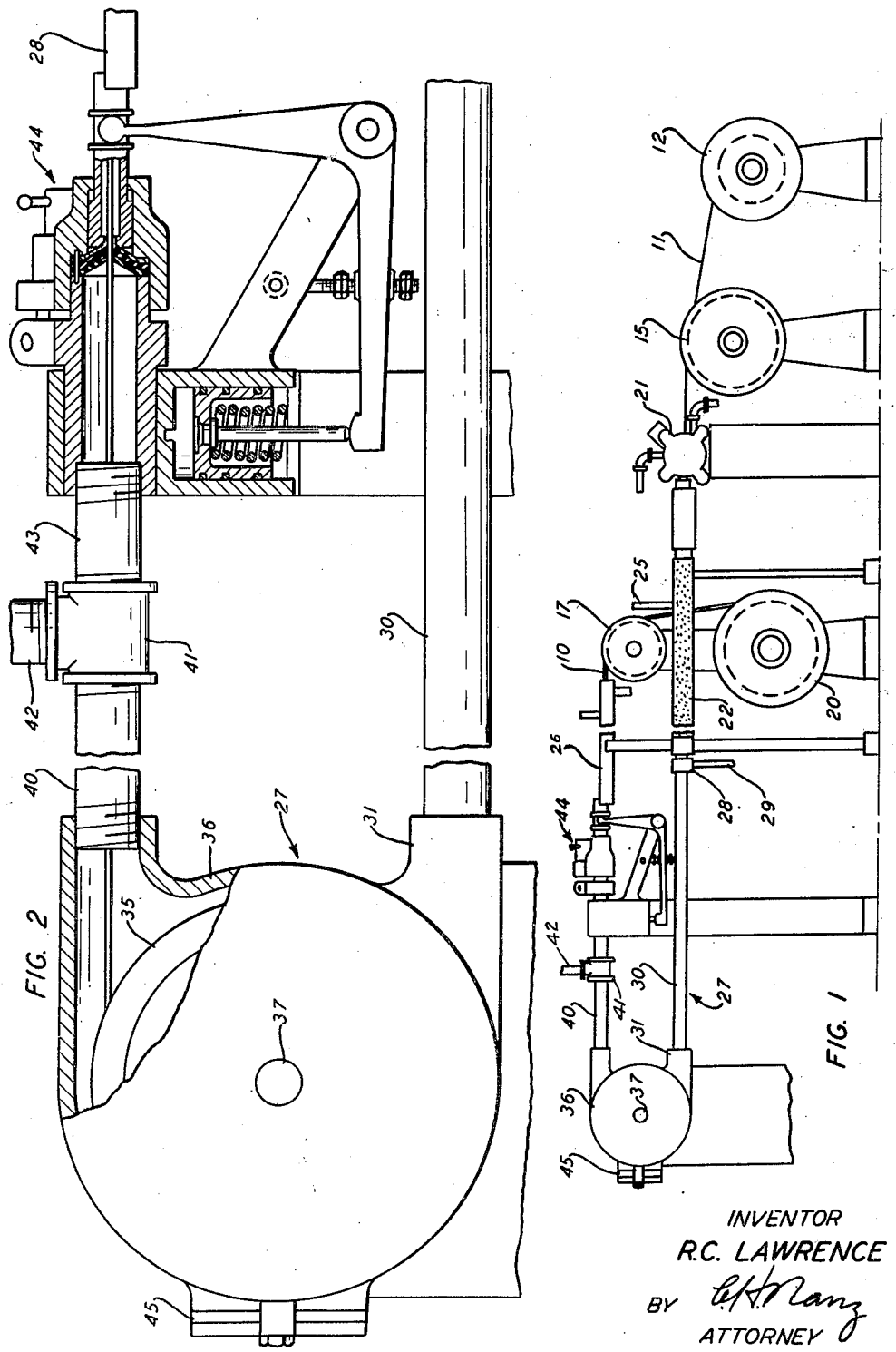
INVENTOR
R.C. LAWRENCE
BY
ATTORNEY Patented Mar. 18, 1952

2,589,713

UNITED STATES PATENT OFFICE 2,589,713

APPARATUS FOR CONTINUOUSLY MAKING VULCANIZED ARTICLES

Roger C. Lawrence, Ridgewood, N. J., assignor to Western Electric Company, Incorporated, New York, N. Y., a corporation of New York Application May 22, 1947, Serial No. 749,829

5 Claims. (Cl. 18—6)

This invention relates to apparatus for continuously making vulcanized articles, and more particularly to apparatus for cooling continuous lengths of filamentary vulcanized articles emerging from vulcanizing tubes having steam under high pressure therein and for sealing the steam in the vulcanizing tubes.

In the manufacture of filamentary articles having coverings of vulcanizable compounds over cores which include moisture, usually present in elements of hygroscopic materials, such as textile materials, such a core is sometimes passed through an extruder for extruding a covering of vulcanizable compound thereover, and then through a vulcanizing tube to vulcanize the covering. The vulcanizing tube has steam at high temperature and under high pressure therein, and heat from the steam is absorbed by all elements of the cores. While the cores are in the vulcanizing tubes and subject to the high pressures of the steam on their outer surfaces, no damage is done. However, if the cores are not cooled sufficiently before they are withdrawn into the atmosphere, the stored heat will convert moisture inside the covers into steam, which is likely to create pressures sufficient to rupture or blister the coverings. In order to sufficiently cool the covering and the vaporized moisture while the coverings are still under a high pressure, a cold water under a pressure substantially the same as that of the steam in the vaporizing tube is sometimes introduced into a seal extending from the exit of the vulcanizing tube. In the past, such seals have been very long so that large areas of floor space were required for them. If the seals were not sufficiently long, less floor space was needed but the cooling effect thereof was insufficient to prevent damage to the covering of such an article at normal high rates of speed at which the article is advanced through the apparatus.

An object of the invention is to provide new and improved apparatus for continuously making vulcanized articles.

A further object of the invention is to provide new and improved apparatus for preventing the escape of steam from vulcanizing tubes into the atmosphere and for cooling under external pressure articles being withdrawn from the tubes to reduce the internal pressure of vaporized moisture in the articles sufficiently to prevent rupturing the articles and to effect a large saving in floor space over that normally required for past known apparatus for effecting these ends.

An apparatus for continuously making vulcanized articles illustrating certain features of the invention includes an elongated vulcanizing tube and a U-shaped cooling tube having one of the arms thereof connected to the vulcanizing tube. A return sheave mounted in the cooling tube guides a vulcanized article from one of the arms of the tube to the other. Means are provided for introducing into the vulcanizing tube a vulcanizing medium under a high pressure, and means are provided for introducing a cooling medium under a high pressure into the cooling tube to hold the steam in the vulcanizing tube.

A complete understanding of the invention may be obtained from the following detailed description of an apparatus forming a specific embodiment thereof, when read in conjunction with the appended drawing, in which:

Fig. 1 is a fragmentary side elevation of an apparatus embodying certain features of the invention, and Fig. 2 is an enlarged fagmentary, partially sectional view of a portion of the apparatus.

Referring now in detail to the drawing, there is shown therein a continuous extruding and vulcanizing machine for forming and vulcanizing continuously a protective covering 10 (Fig. 1) around a conductive core 11, which may include conductive elements and hygroscopic elements, to form a covered core. In forming the covering upon the core, the core is advanced continuously from a supply reel 12 at a high rate of speed by a capstan 15, which is disclosed and claimed in copending application Serial No. 697,809, filed September 18, 1946, by D. D. Jones for "Apparatus for Covering Cores," and is advanced continuously from the supply capstan 15 by a takeup capstan 17 to a takeup reel 20. As the core is drawn from the supply capstan 15, it passes through an extruder 21, which extrudes the covering 10 of vulcanizable compound thereover. The covered core then passes into an elongated vulcanizing tube 22, which has steam under a high pressure supplied thereto by a steam pipe 25, whereby the covering of vulcanizable compound is vulcanized as it is advanced through the vulcanizing tube. The covered core passes from the vulcanizing tube directly into and through a U-shaped pressure cooling and sealing unit 27 to a trough 26, through which it is advanced to the capstan 17. The left end, as viewed in Fig. 1, of the vulcanizing tube 22 is connected to a T-coupling 28 to which a drain pipe 29 is connected and to which an arm 30 of a U-shaped housing 31 is connected.

A return sheave 35 is mounted rotatably in a cylindrical portion 36 of the housing 31 in bearings of which a bearing 37 is shown. The covered conductor is advanced from the vulcanizing tube through the T-coupling 28, through the tubular arm 30, half way around the return sheave 35 and through a tubular arm 40 of the housing 31. The tubular arm 40 is connected to a T-coupling 41, to which are connected a pipe 42 for supplying cold water under a pressure equal to that of the steam in the vulcanizing tube and a nipple 43. A mechanical seal 44 is connected to the nipple 43. The seal 44 is similar to those shown in Patent 1,689,206 to Lamplough for "Apparatus For Treating Vulcanizable Material" and Reissue Patent 19,820 to Cherry et al. for "Apparatus For Handling Treated Articles." The seal 44 serves to substantially prevent escape of the water in the tubular arm 40 of the sealing unit 27 into the atmosphere, but permits the covered conductor to pass therethrough into the trough 26, into which cold water may be introduced to further cool the covered conductor if necessary. The cylindrical portion 36 of the U-shaped housing 31 is provided with a covered hand-hole means 45 to provide access to the interior thereof for purposes of stringing up the apparatus.

*Operation*

In the operation of the apparatus described hereinabove, the core 11 is advanced by the capstan 17 through the extruder, the vulcanizing tube, and the tubular arm 30 of the cooling unit 27, around the sheave 36, through the tubular arm 40 of the unit 27, the coupling 41, the nipple 43, the mechanical seal 44 and the trough 26, and is wound upon the take-up reel 20. As the core 11 is advanced through the extruder 21, the extruder forms thereover the covering 10 of vulcanizable compound, and stream introduced into the vulcanizing tube 22 heats the covering 10 to a high temperature to vulcanize it. Heat absorbed by the covered core during this operation is sufficient to vaporize any moisture which may be enclosed by the covering with the creation of internal pressures sufficient to rupture the covering if it were exposed suddenly while hot to atmospheric pressure.

As the covering 10 is advanced through the cooling and sealing unit 27, cold water under high pressure introduced therein by the pipe 42 cools the covered core sufficiently that, as the covered conductor passes into atmospheric pressure as it emerges from the mechanical seal 44, the pressure of the vaporized moisture is not sufficient to damage the covering 10. While the covering 10 is in the cooling and sealing unit 27, the water, which is under a pressure equal to that of the steam in the vulcanizing tube, toughens the covering and applies a sufficiently high exterior pressure thereto to prevent any vaporized moisture enclosed inside of the covering from bursting through the covering. The pressures of the cooling water and the steam are maintained at equal, high pressures by a suitable means (not shown), and strike a balance point at the T-coupling 28, from which condensed steam and the cooling water are drawn into the drain pipe 29. The drain pipe 29 is connected to a steam trap (not shown) to maintain the high pressure of the water and steam in the cooling and sealing unit 27 and the vulcanizing tube 22, respectively.

The looped-back structure of the cooling and sealing unit 27 provides adequate length for cooling the covered conductor sufficiently to prevent damage to the covering from internal pressures therein even when the apparatus is run at top speed, and occupies much less floor area than ordinarily would be required for an adequate cooling and sealing unit of the ordinary type. The tubular arm 30 of the unit 27 is sufficiently long to ensure that the covering 10 has been cooled and toughened sufficiently by the time it reaches the return sheave 35 to avoid any danger of the covering 10 being loosened from the core 11 as the covered conductor is advanced around the return sheave 35. The tubular arm 30 and the vulcanizing tube 22 have internal diameters of the same size and are mounted in alignment with each other so that there is no possiblity of scraping the cover 10 as the covered conductor is advanced from the vulcanizing tube into the cooling and sealing unit 27.

The above-described apparatus is suitable for forming other types of filamentary articles than covered conductors. For example, tapes, ribbons, tubes, rods or the like, either composite or homogeneous, could be formed by apparatus embodying the invention.

What is claimed is:

1. An apparatus for continuously making vulcanized articles of indefinite length, which comprises an elongated vulcanizing chamber, a continuous, pressure tight, U-shaped cooling conduit, means for securing one end of said conduit to the vulcanizing chamber, a seal secured to the other end of said conduit for permitting an elongated, filamentary article to advance therethrough while substantially preventing the escape of liquid therethrough from the conduit, means for introducing a vulcanizing medium under high pressure into the vulcanizing chamber, and means for introducing a cooling liquid into the U-shaped cooling conduit under a high pressure, whereby said conduit is kept entirely filled with the cooling liquid under high pressure.

2. An apparatus for vulcanizing elongated filamentary articles, which comprises, a vulcanizing chamber, means for introducing a vulcanizing medium under a high, predetermined pressure into the vulcanizing chamber, a U-shaped, open conduit having a pair of hollow arms and an intermediate portion positioned between the pair of arms, means for connecting one of said arms to the exit end of the vulcanizing chamber, a sheave mounted rotatably in the intermediate portion, means for advancing a filamentary article covered with a vulcanizable compound through the vulcanizing tube and the conduit, means for introducing a cooling medium into the conduit under a pressure substantially equal to that of vulcanizing medium in the vulcanizing chamber, means positioned at the juncture of the vulcanizing chamber and the arm of the conduit connected to the vulcanizing chamber for withdrawing the cooling medium from the conduit and for withdrawing condensed steam from the vulcanizing chamber, and a seal at the end of the free arm of the U-shaped conduit for preventing the escape of the cooling medium therefrom into the atmosphere whereby the entire U-shaped conduit is kept filled with water under high pressure.

3. A continuous vulcanizing apparatus, which comprises an elongated vulcanizing tube, a cooling tube connected to one end of the vulcanizing tube, a watertight housing connected to the cooling tube in communication therewith, a second cooling tube connected to the housing in communication therewith and disposed substantially parallel to the first cooling tube, means for advancing a covered core through the vulcanizing tube, the first cooling tube, the housing and the second cooling tube, and a guide sheave mounted rotatably in the housing for guiding a covered core so advanced through the housing from the first cooling tube to the second cooling tube means for introducing steam under a high pressure into the vulcanizing tube, means for introducing cold water into the housing and the cooling tubes under a pressure substantially equal to that of the steam, and a seal mounted on the free end of the second-mentioned cooling tube for preventing the escape of water therefrom while permitting a covered core to be advanced therethrough, whereby the housing and the cooling tubes are kept filled with water under high pressure.

4. A continuous vulcanizing apparatus, which comprises an elongated vulcanizing tube, a cooling tube connected to one end of the vulcanizing tube, a cylindrical housing connected to the cooling tube in communication therewith, a second cooling tube connected to the cylindrical housing in communication therewith and disposed substantially parallel to the first cooling tube, a mechanical seal mounted on the free end of the second cooling tube for sealing that end of the cooling tube from the atmosphere while permitting a covered core to be advanced therethrough, means for advancing a covered core through the vulcanizing tube, the first cooling tube, the cylindrical housing, the second cooling tube and the mechanical seal, a guide sheave mounted rotatably in the cylindrical housing for guiding a covered core so advanced through the cylindrical housing from the first cooling tube to the second cooling tube, means for introducing steam under a predetermined high pressure into the vulcanizing tube, means for introducing cold water into the housing and the cooling tubes under a pressure substantially equal to that of the steam, and means for withdrawing the water and any condensed steam from the first cooling tube and the vulcanizing tube, respectively, at a point substantially at the juncture of the first cooling tube and the vulcanizing tube.

5. An apparatus for continuously making vulcanized articles, which comprises an elongated unobstructed conduit, a drain positioned at a point in the conduit between the ends thereof, means for introducing a vulcanizing medium under a high pressure into the conduit at a point on one side of the drain, means for introducing a cooling medium under a high predetermined pressure into the conduit at a point on the other side of the drain to cool a covered conductor advanced through the conduit, a plurality of resilient washers positioned at the end of the conduit on the same side of the drain as the point at which the cooling medium is introduced into the conduit, and means for pressing the washers closely around the covered conductor to effectively prevent escape of the cooling medium from the conduit through the washers.

ROGER C. LAWRENCE.

REFERENCES CITED

The following references are of record in the file of this patent:

UNITED STATES PATENTS

| Number | Name | Date |
|---|---|---|
| 2,069,087 | Forstrom et al. | Jan. 26, 1937 |
| 2,426,341 | Canfield | Aug. 26, 1947 |

FOREIGN PATENTS

| Number | Country | Date |
|---|---|---|
| 505,162 | Great Britain | May 5, 1939 |
| 864,121 | France | Jan. 8, 1941 |